United States Patent [19]

Cassel et al.

[11] Patent Number: 4,623,164

[45] Date of Patent: Nov. 18, 1986

[54] BAND CLAMP FOR AXLE ASSEMBLY AND THE LIKE

[75] Inventors: Thomas R. Cassel; Scott T. Cassel, both of Birmingham, Mich.

[73] Assignee: BKS Company, Birmingham, Mich.

[21] Appl. No.: 680,735

[22] Filed: Dec. 11, 1984

[51] Int. Cl.[4] .......................... F16L 13/14; F16L 21/06
[52] U.S. Cl. ...................................... 280/689; 24/279; 24/20 LS; 285/337; 285/419
[58] Field of Search ............... 280/689, 707, 724, 725; 267/15 R, 20 A; 24/279, 19, 20 LS; 285/337, 419

[56] References Cited

U.S. PATENT DOCUMENTS

| | | | |
|---|---|---|---|
| 2,835,954 | 5/1958 | Dahl | 24/279 |
| 3,905,623 | 9/1975 | Cassel | 285/382 |
| 3,944,265 | 3/1976 | Hiemstra | 285/419 |
| 4,056,273 | 11/1977 | Cassel | 285/337 |
| 4,113,285 | 9/1978 | Wagner et al. | 285/322 |
| 4,261,600 | 4/1981 | Cassel | 285/177 |
| 4,312,526 | 1/1982 | Cassel | 285/419 |

Primary Examiner—Richard A. Bertsch
Attorney, Agent, or Firm—Reising, Ethington, Barnard, Perry & Milton

[57] ABSTRACT

A band clamp is disclosed for clamping a stabilizer bar to a cross-beam rear axle in a front wheel drive vehicle. A preformed band has a sleeve portion which conforms to the inverted V-shape axle and it has a channel portion with opposed sidewalls extending from contiguous sides of the clamp at one corner. A spline is disposed between the sidewalls and has a concave surface opposite a shaped washer on the outside of one of the sidewalls. A bolt extends through the sidewalls, the spline and the shaped washer and a nut on the bolt is tightened to draw the sidewalls into engagement with the spline to stretch the sleeve portion around the axle.

9 Claims, 5 Drawing Figures

BAND CLAMP FOR AXLE ASSEMBLY AND THE LIKE

FIELD OF THE INVENTION

This invention relates to clamping devices and more particularly, it relates to an axle assembly band clamp for use with automotive vehicles.

BACKGROUND OF THE INVENTION

In the rear suspension system of front wheel drive vehicles it is a common practice to utilize a stabilizer bar in combination with a cross-beam axle. In such suspension systems, the axle is a substantially rigid beam connected between the control arms which are pivotally mounted to the vehicle frame and carry the wheel spindles for the rear wheels. The stabilizer bar is a torsion rod extending between the control arms adjacent the axle and having a crank arm at each end which is secured to the respective control arms. The control arms, and hence the wheels, are allowed to move independently by reason of torsional flexure of the stabilizer bar; however, the torque transmitted by the stabilizer bar tends to cause one wheel to follow the movement of the other when a bumpy roadway is encountered. It tends to prevent a condition known as tramp which would obtain with one wheel in the extreme upward position, called full jounce, and with the other wheel in the extreme downward position, called full bounce.

To provide a fixed torsion axis for the stabilizer bar, the torsion rod portion of the bar is secured to the axle. Preferably, the securement is made at two locations between the crank arms of the stabilizer bar. The connection of the stabilizer bar to the axle must resist substantial forces of a cyclical character from the substantially continuous movement of the wheels relative to the vehicle frame due to roughness of the roadway. Additionally, the connection between the stabilizer bar and the axle must be compact because of space limitation and it must be of rugged construction because of its exposure under the vehicle.

In the prior art, the torsion bar is connected with a channel-shaped axle by a clamp of the U-bolt and saddle type. In this arrangement, the torsion rod of the stabilizer bar is disposed within the channel-shaped axle and is spaced therefrom by a set of three metal stampings which, when assembled, form a hole therethrough to receive the torsion bar and a soft rubber grommet surrounding it. The U-bolt and saddle clamp assembly has a conforming configuration and is tightened by a pair of nuts on the respective legs of the U-bolts. Subsequently in the prior art, a pair of hard plastic inserts were substituted for the metal stampings. One difficulty with this prior art is that the U-bolt and saddle assembly requires a significant amount of space and it requires the proper tightening of two nuts to achieve the desired holding force. In some installations, there is limited clearance around the axle and there is not adequate space from the gas tank to accommodate the saddle and nut connection on the forward part of the U-bolt.

A general object of this invention is to provide an improved stabilizer bar clamp and assembly which overcomes certain disadvantages of the prior art.

SUMMARY OF THE INVENTION

In accordance with this invention, a band clamp is provided for clamping a body having an irregular shape and including contiguous faces forming a corner. This is accomplished by a preformed band having a sleeve portion with a cross-sectional configuration corresponding to that of the body and a channel portion with first and second sidewalls which are extensions of contiguous segments of the sleeve portion and extending in the direction of one of said segments. A spline is disposed between the sidewalls and has a substantially flat surface opposite the first sidewall and a concave surface opposite the second sidewall. A spacer with a convex surface is disposed opposite said concave surface. A bolt extends through the sidewalls, spline and spacer and has a nut for drawing the sidewalls into engagement with the spline to stretch the sleeve portion around the body.

Further, according to this invention, the first sidewall is comprised of a folded portion of said one segment with a bight at the free end. Further, a flat side of the spline is seated on the first sidewall and the bolt is press-fitted through an opening in the spline whereby the bolt and spline are held captive with the first sidewall.

Further, the second sidewall is comprised of a folded portion of said other segment with a bight at the free end. The spacer is U-shaped in cross-section and is seated in an arcuate portion of the second sidewall and held captive by a pair of tangs extending from the folded portion of the second sidewall.

Further, the invention provides a band clamp which is especially adapted for use with a vehicle cross-beam axle for the purpose of clamping a stabilizer bar within the confines of an axle having a cross-section of triangular shape.

A general object of this invention is to provide a band clamp which overcomes certain disadvantages of the prior art.

A more complete understanding of this invention may be obtained from the detailed description that follows taken with the accompanying drawings.

BEST MODE FOR CARRYING OUT THE INVENTION

Figure 1:
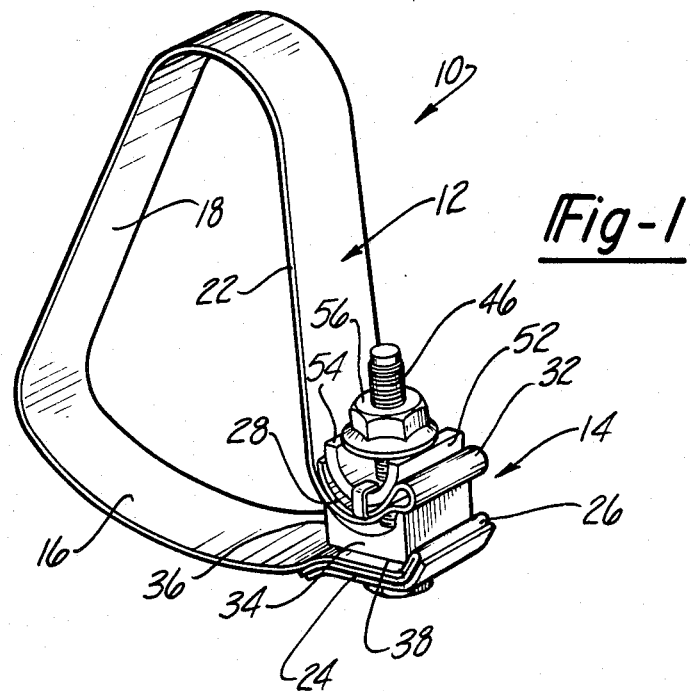
FIG. 1 is a perspective view of the band clamp of this invention.

Referring now to the drawings, there is shown an illustrative embodiment of the invention in a band clamp especially adapted for use on a vehicle cross-beam axle of triangular cross-section for retaining a stabilizer bar within the confines of the axle. It will be apparent as the description proceeds that the invention is useful in other applications and may be utilized in different embodiments.

Figure 2:
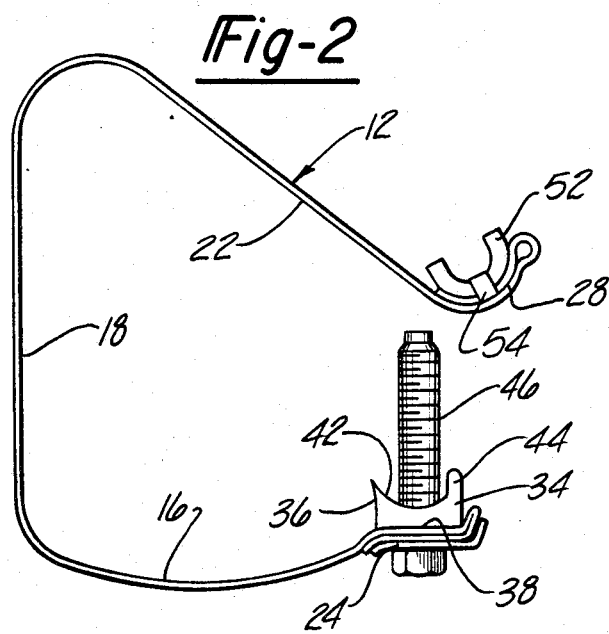
FIG. 2 is a side elevation of the clamp with the clamp in an open position.
Figure 3:
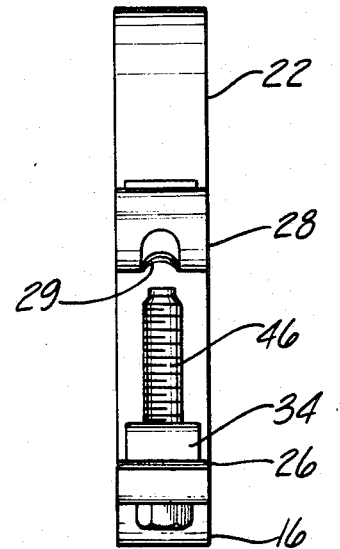
FIG. 3 is a front elevation showing the clamp in the open position.

Referring now to FIG. 1, the band clamp 10 of this invention is shown in perspective view in a partially tightened condition to illustrate the coaction of the elements of the clamp. FIGS. 2 and 3 show the clamp in an open condition which allows it to be slipped sideways over a body to be clamped by opening the clamp as needed to accommodate the body. The clamp will be described subsequently with reference to its tightened condition around a body to be clamped.

The clamp 10 comprises a sleeve portion 12 and a channel portion 14. The sleeve portion has a triangular cross-section with a base segment 16 and two side segments 18 and 22. The channel portion 14 is disposed at the corner formed by the side segment 22 and the base segment 16.

The channel portion comprises a first sidewall 24 which is formed as an extension of the base segment 16 and extends in substantially the same direction. The sidewall 24 is comprised of a folded portion having a bight 26 at the free end extending perpendicularly to the sidewall 24. The channel portion also includes a second sidewall 28 which is formed as an extension of the side segment 22 and extends generally in the same direction as the base segment 16 opposite the sidewall 24. The sidewall 28 is arcuate in cross-section with a concave surface on the outside of the channel formed by the sidewalls 24 and 28. The sidewall 28 is comprised of a folded portion with a bight 32 at the free end. The sleeve portion 12 and the channel portion 14 are in the configuration just described when the band clamp is partially tightened, as shown in FIG. 1, and also when the band clamp is fully tightened as will be described subsequently.

In order to stretch the sleeve portion 12 around a body to be clamped, a force applying means is connected with the channel shaped portion 14. The force applying means comprises a reaction member or spline 34 which is disposed within the channel space between the two sidewalls 24 and 28 of the channel portion 14. The spline 34 is adapted to seat against the outer surface of the body to be clamped, as will be described subsequently. The spline 34 has an inner surface 36 of arcuate configuration adapted to conform to the outer surface of the body to be clamped. The spline has a flat surface 38 which is seated against the flat sidewall 24. The spline has a concave upper surface 42 extending from the inner edge of surface 36 to a flange 44 which extends substantially perpendicularly to the flat bottom surface 38. A bolt 46 extends through a clearance hole in sidewall 24 and has an interference fit in a hole in the spline; it is press-fitted through the hole in the spline 34 so that the spline is held captive to the sidewall 24. The sidewall 28 has a clearance hole 29 through which the bolt 46 extends.

The force applying means further comprises a spacer or shaped washer 52 which is disposed against the outer concave surface of the sidewall 28. The washer 52 is U-shaped in cross-section and has an arcuate outer surface which conforms to the arcuate surface of the sidewall 28. The washer 52 is held captive by a pair of tangs 54 which are unitary with the sidewall 28 and are bent over the washer 52 to hold it in place. The washer 52 has a clearance hole aligned with the hole 29 in the second sidewall 28 to accommodate the bolt 46. A nut 56 is screwed onto the bolt 46 and is seated against the edges of the washer 52.

Preferably, all parts of the clamp are constructed of metal. The band, including the sleeve portion and the channel portion, is preferably constructed of aluminized steel. The spline 34 is preferably constructed of aluminum and the washer 52 is made of steel.

Figure 4:
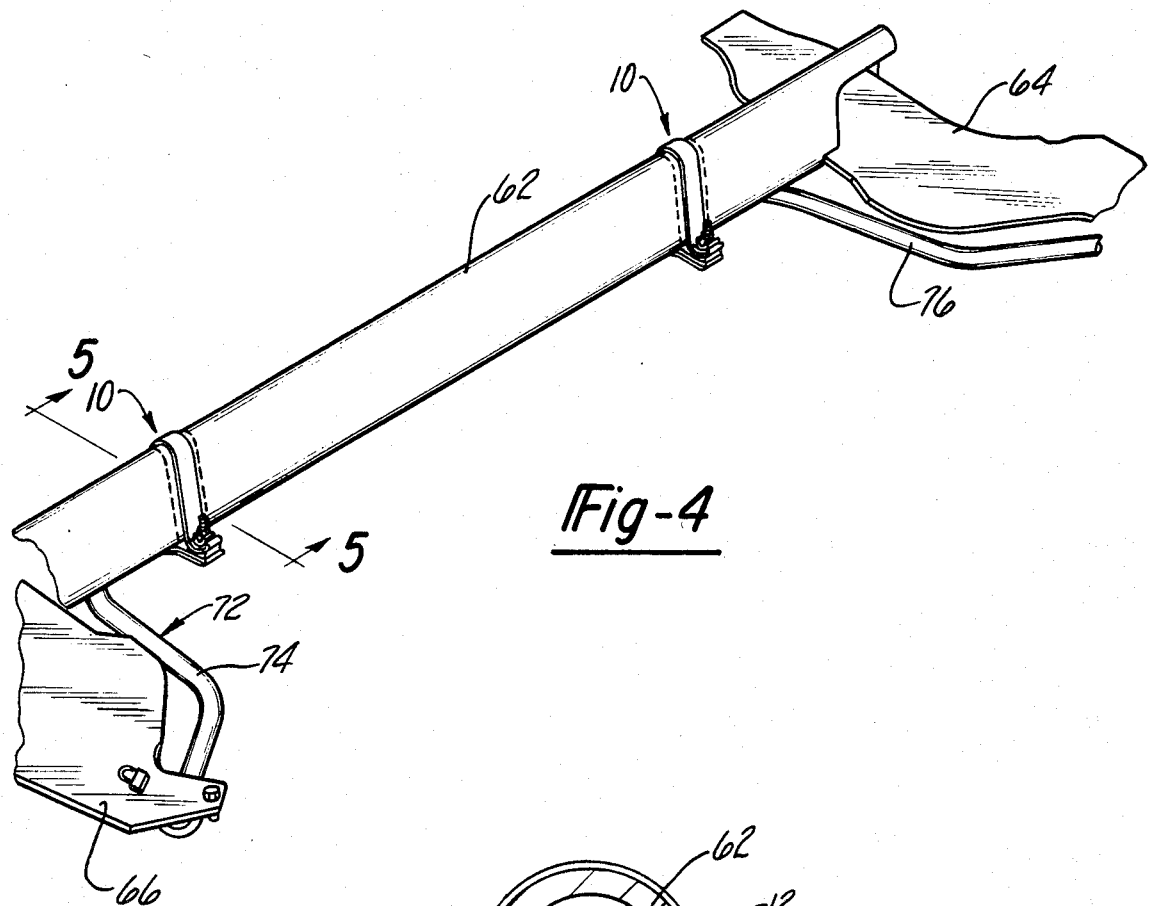
FIG. 4 is a perspective view of a cross-beam axle and torsion bar with band clamps according to this invention.
Figure 5:
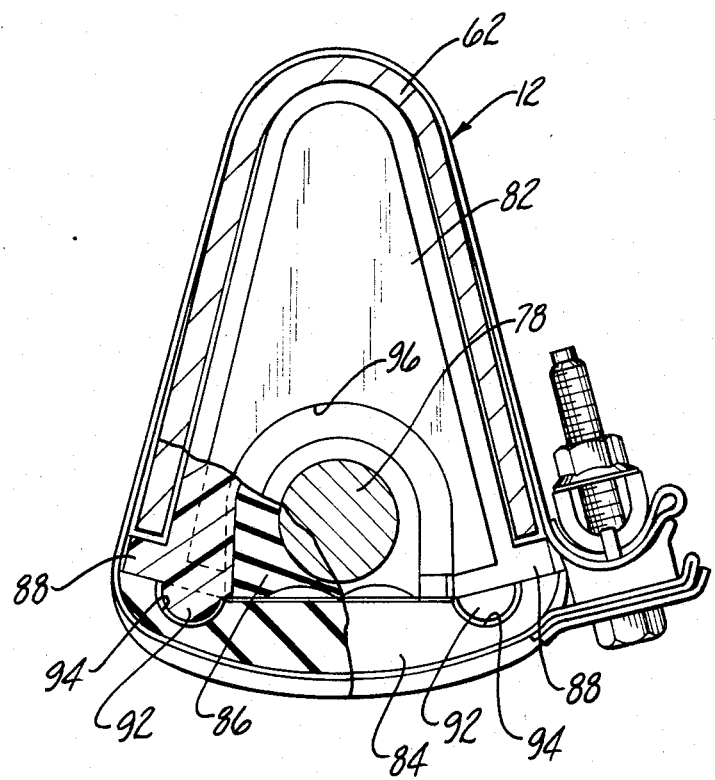
FIG. 5 is a view, partially in section, taken on lines 5—5 of FIG. 4.

The installation of the clamp 10 on a cross-beam axle of an automotive vehicle is shown in FIGS. 4 and 5. In a typical installation in a front wheel drive vehicle, two clamps 10 are applied to the rear wheel cross-beam axle 62. The cross-beam axle 62 is an inverted channel with V-shape cross-section and extends between the right wheel control arm 64 and the left wheel control arm 66 of the rear wheel suspension system. A stabilizer bar 72 extends between the control arms 64 and 66; it comprises a crank arm 74 at one end connected to the control arm 66 and a crank arm 76 at the other end connected to the control arm 64 with a torsion rod section 78 extending between the crank arms. The torsion rod 78 is disposed within the confines of the cross-beam axle and is held in substantially fixed relationship to the cross-beam axle 62 by a pair of clamp assemblies which will be described with reference to FIG. 5.

The retainer assembly for the torsion rod 78 comprises an upper insert block 82 and a lower insert block 84; it also includes a grommet 86 and the band clamp 10. The insert block 82 is constructed of a hard plastic material. It has a surface configuration at its upper end which conforms to the inner surface of the cross-beam axle 62 and it has divergent side walls which are spaced with small clearance from the cross-beam axle. The block 82 is provided with a pair of flanges 88 disposed on opposite sides thereof and spaced with small clearance from the respective lower edges of the cross-beam axle. The block 82 is also provided with a pair of guide ribs 92 on the bottom surface of the block. The lower insert block 84 has an arcuate lower surface and is provided with a pair of guide slots 94 which are mated with respective guide ribs 92. The lower insert block 84 has a width sufficient to span the side flanges 88 of the block 82 and to extend slightly beyond the lower outside edges of the cross-beam axle 62. The upper insert block 82 is provided with a channel 96 for accommodating the grommet 86. The grommet 86 is constructed of elastomeric material in the form of a split elongated ring. The grommet 86 is installed on the torsion rod 78 by spreading it open and slipping it sideways over the torsion rod.

The band clamp 10 is installed on the cross-beam axle 62 in the following manner. With the upper insert 82, the grommet 86 and the lower insert 84 in place, the band clamp 10 is spread open in the manner shown in FIG. 2 so that it will pass sideways over the axle 62. The bolt 46 with the captive spline 34 thereon is pushed through the clearance holes in the sidewall 28 and the washer 52 the nut and 56 is screwed onto the bolt. The nut 56 is tightened until the sidewall 28 is seated against the arcuate surface 42 of the spline 34. With this tightening action, the flange 44 is slightly deformed by the sidewall 28. The arcuate surface 36 of the spline 34 is seated against the sides of the upper insert block 82 and the lower insert block 84. The sleeve portion 12 of the band clamp is stretched so that the lower insert 84 is held tightly against the upper insert 82 which is tightly seated in the cross-beam axle 62. The peripheral length of the sleeve portion 12 of the band clamp is designed so that it is stretched by the tightening action by an amount corresponding to the desired clamp load and percentage stress. In an exemplary embodiment, the desired clamp load is achieved and the stresses do not exceed about 50% of the yield strength of the material when the nut 56 is fully tightened, i.e. so that the sidewall 28 and the sidewall 24 are fully seated against the spline 34. With this relationship, there is reduced likelihood of fatigue failure of the band clamp from the cyclical loading which results from the forces on the torsion bar 78.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A band clamp for a body having a cross-section with two substantially flat, contiguous faces forming a corner, a preformed band including a sleeve portion and a channel portion, said sleeve portion having a cross-sectional configuration corresponding to said body with two substantially flat, contiguous segments forming a corner, said channel portion comprising first and second sidewalls extending in substantially the same direction as one of said segments and terminating in free ends separated from each other, said first sidewall being an extension of said one of said segments, said second sidewall being in extension of the other segment and being arcuate in cross-section, a spline disposed between said sidewalls with a substantially flat surface opposite said first sidewall and a concave surface opposite said second sidewall, a spacer having a convex surface opposite said concave surface, a bolt extending through the sidewalls, spline and spacer and a nut on said bolt for drawing the sidewalls into engagement with said spline to stretch said sleeve portion around said body.

2. The invention as defined in claim 1 wherein said first sidewall is comprised of a folded portion of said one segment with a bight at the free end thereof.

3. The invention as defined in claim 2 wherein said bight extends substantially perpendicularly to said first sidewall.

4. The invention as defined in claim 3 wherein said spline is seated on said first sidewall adjacent said bight and said bolt is press-fitted through an opening in said spline whereby said bolt and spline are held captive with said first sidewall.

5. The invention as defined in claim 1 wherein said second sidewall is comprised of a folded portion of said other segment with a bight at the free end thereof.

6. The invention as defined in claim 5 wherein said spacer is U-shaped in cross-section and is seated in the arcuate portion of said second sidewall, and a pair of tangs extending from said folded portion of the second sidewall engaging said spacer to hold it captive.

7. In combination with a vehicle cross-beam axle of the type having a cross-section of triangular shape, a stabilizer bar disposed within the confines of said axle and a retainer disposed between the axle and the stabilizer bar and having a surface segment extending across the open side of said axle, a band clamp having a preformed band including a sleeve portion and a channel portion, said sleeve portion having a cross-sectional configuration of triangular shape.

said channel portion comprising first and second sidewalls extending in substantially the same direction as one side of the sleeve portion and terminating in free ends separated from each other, said first sidewall being an extension of said one side, said second sidewall being an extension of an adjoining side and being arcuate in cross-section, a spline disposed between said sidewalls with a substantially flat surface opposite said first sidewall and a concave surface opposite said second sidewall, a spacer having a convex surface opposite said concave surface, a bolt extending through the sidewalls, spline and spacer and a nut on said bolt for drawing the sidewalls into engagement with said spline to stretch said sleeve portion around said axle.

8. The invention as defined in claim 7 wherein said spline is seated on said first sidewall adjacent said bight and said bolt is press-fitted through an opening in said spline whereby said bolt and spline are held captive with said first sidewall.

9. The invention as defined in claim 7 wherein said second sidewall is comprised of a folded portion of said other segment with a bight at the free end thereof and wherein said spacer is U-shaped in cross-section and is seated in the arcuate portion of said second sidewall and, a pair of tangs extending from said folded portion of the second sidewall engaging said spacer to hold it captive.

* * * * *